United States Patent [19]

Berrie et al.

[11] 3,817,975
[45] June 18, 1974

[54] WATER-INSOLUBLE DISAZO DYESTUFF DERIVED FROM A DIHYDROXYPYRIDINE AS COUPLING COMPONENT

[75] Inventors: Alistair Howard Berrie; Nigel Hughes, both of Manchester, England

[73] Assignee: Imperial Chemical Industries Limited, London, England

[22] Filed: Dec. 1, 1969

[21] Appl. No.: 881,311

[30] Foreign Application Priority Data
Dec. 9, 1968  Great Britain.................... 58280/68

[52] U.S. Cl............................... 260/156, 260/154
[51] Int. Cl. ...................... C09b 31/14, C09b 33/12
[58] Field of Search......................... 260/156, 146 R

[56] References Cited
UNITED STATES PATENTS

| | | | |
|---|---|---|---|
| 2,431,190 | 11/1947 | Morgan............................ | 260/156 X |
| 2,857,372 | 10/1958 | Straley et al...................... | 260/146 |
| 2,888,451 | 5/1959 | Henecka et al.................... | 260/156 |
| 3,419,570 | 12/1968 | Petersen et al. ................. | 260/156 X |
| 3,487,066 | 12/1969 | Ritter et al........................ | 260/156 |

Primary Examiner—Floyd D. Higel
Attorney, Agent, or Firm—Cushman, Darby & Cushman

[57] ABSTRACT

Water-insoluble disazo dyestuff having the formula

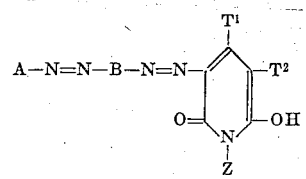

wherein A is an optionally substituted aryl, thioazolyl, benzthiazolyl or anthraquinonyl, B is an optionally substituted phenylene, naphthylene or 4-pyrazolonyl-1-phenyl, Z is hydrogen or optionally substituted lower alkyl or phenyl, $T^1$ and $T^2$ each independently represent hydrogen, optionally substituted alkyl or aryl or hydroxy, cyano, carbonamido, acyl or carboalkoxy, and the use of said dyestuff for coloring paints, synthetic polymers and textile materials, in particular polyester textile materials, the coloration of which is fast to dry heat treatments.

3 Claims, No Drawings

WATER-INSOLUBLE DISAZO DYESTUFF DERIVED FROM A DIHYDROXYPYRIDINE AS COUPLING COMPONENT

This invention relates to water-insoluble disazo dyestuffs which are valuable as dyestuffs and also as pigments.

According to the invention there are provided the water-insoluble disazo dyestuffs, free from carboxylic and sulphonic acid groups, which, in one of the possible tautomeric forms, are of the formula:

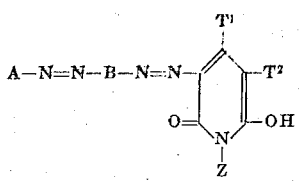

wherein A is an optionally substituted aryl, anthraquinonyl or heterocyclic radical;
B is an optionally substituted phenylene, naphthylene or

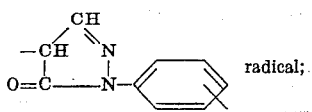

radical;

Z represents a hydrogen atom or an optionally substituted alkyl, aralkyl, cycloalkyl, aryl or heterocyclic radical; $T^1$ represents a hydrogen atom, a —CN, —COOR$^1$, —CONR$^1$R$^2$, —COR$^1$ or —OH group, or an optionally substituted alkyl, aralkyl, cycloalkyl, aryl or heterocyclic radical; $T^2$ represents a hydrogen atom, a —CN, —COOR$^1$, —CONR$^1$R$^2$ or —COR$^1$ group or an optionally substituted alkyl, aralkyl, cycloalkyl, aryl or heterocyclic radical; and R$^1$ and R$^2$ each independently represent a hydrogen atom or an optionally substituted alkyl, aralkyl, cycloalkyl, aryl or heterocyclic radical or R$^1$ and R$^2$ are joined together so that the group —NR$^1$R$^2$ represents the radical of a 5- or 6-membered nitrogen containing heterocyclic ring compound.

The disazo dyestuffs of the invention can exist in a number of tautomeric forms; for convenience the dyestuffs have only been formulated in one of these tautomeric forms, but it is to be understood that this specification relates to dyestuffs in any of the possible tautomeric forms.

The optionally substituted aryl radicals represented by A are preferably phenyl or naphthyl radicals which can contain substituents other than carboxylic acid or sulphonic acid groups, for example, chlorine or bromine atoms or lower alkyl such as methyl, lower alkoxy such as methoxy, hydroxy, nitro, trifluoromethyl, thiocyano, lower alkylsulphonyl such as methylsulphonyl, lower alkylcarbonyl such as acetyl, carbo lower alkoxy such as carbomethoxy, carbonamido and N-lower alkyl and N:N-di(lower alkyl) derivatives thereof such as N-methylcarbonamido and N:N-diethylcarbonamido, sulphonamido and N-lower alkyl and N:N-di(lower alkyl) derivatives thereof such as N-methyl sulphonamido and N:N-diethyl sulphonamido, and acylamino such as formylamino, benzoylamino, acetylamino and methylsulphonylamino groups. The optionally substituted anthraquinonyl radicals represented by A are preferably anthraquinon-1-yl or anthraquinon-2-yl radicals which may contain substituents as are described above. The optionally substituted heterocyclic radicals represented by A are preferably thiazol-2-yl, benzthiazol-2-yl, quinolin-5-, 6-, 7- or 8-yl; 1:2:4-triazol-2-yl; 1:3:4-thiadiazol-2-yl; benziminazol-2-yl; tetrazol-5yl and benzoxazol-2-yl radicals which may contain substituents such as are described above. It is however preferred that A represents an optionally substituted phenyl radical.

The radicals represented by B may contain substituents such as chlorine, bromine, lower alkyl in particular methyl, lower alkoxy in particular methoxy, trifluoromethyl, acylamino in particular groups of the formula —NHCOY wherein Y is hydrogen, lower alkyl, or phenyl, carbo lower alkoxy and carbonamido and N-lower alkyl and N:N-di(lower alkyl) derivatives thereof.

Throughout the specification the terms "lower alkyl" and "lower alkoxy" are used to denote alkyl and alkoxy radicals respectively containing from one to four carbon atoms.

The optionally substituted alkyl radicals represented by Z, $T^1$, $T^2$, $R^1$ and $R^2$ are preferably optionally substituted lower alkyl radicals, and as specific examples of such radicals there may be mentioned methyl, ethyl, n-propyl and n-butyl, hydroxy lower alkyl such as β-hydroxyethyl, lower alkoxy lower alkyl such as β-(methoxy or ethoxy)ethyl and γ-methoxypropyl, cyanomethyl, carbamoylmethyl, carbethoxymethyl and acetylmethyl.

As examples of aralkyl radicals represented by Z, $T^1$, $T^2$, $R^1$ and $R^2$ there may be mentioned benzyl and β-phenylethyl. As an example of cycloalkyl radicals represented by Z, $T^1$, $T^2$, $R^1$ and $R^2$ there may be mentioned cyclohexyl. The optionally substituted aryl radicals represented by Z, $T^1$, $T^2$, $R^1$ and $R^2$ are preferably optionally substituted phenyl radicals and as specific examples of such radicals there may be mentioned phenyl, tolyl, chlorophenyl, methoxyphenyl and ethoxyphenyl. The optionally substituted heterocyclic radicals represented by Z, $T^1$, $T^2$, $R^1$ and $R^2$ are preferably optionally substituted 5- and 6-membered heterocyclic rings, and as specific examples of such radicals there may be mentioned 2-pyridyl, 2-thiazolyl, 1-piperidinyl and 1-morpholinyl.

As examples of 5- and 6-membered nitrogen-containing heterocyclic rings formed by joining R$^1$, R$^2$ and the nitrogen atom there may be mentioned piperidine, morpholine, piperazine and pyrrolidine.

According to a further feature of the invention there is provided a process for the manufacture of the disazo dyestuffs, as hereinbefore defined, which comprises diazotising an amine of the formula:  A—N = N—B—NH$_2$    Formula I and coupling the resulting diazo compound with a coupling component which, in one of the possible tautomeric forms, is represented by the formula:

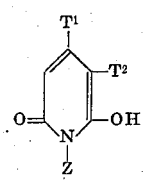

Formula II wherein A, B, $T^1$, $T^2$ and Z have the meanings stated above, the amine and coupling component being free from carboxylic and sulphonic acid groups.

The process of the invention can be conveniently carried out by adding sodium nitrite to a solution or suspension of the amine of Formula I in an inorganic acid such as a dilute aqueous solution of hydrochloric acid or concentrated sulphuric acid, and the resulting solution or suspension of the diazo compound is then added to a solution of the coupling component in an aqueous solution of alkali, the pH of the resulting mixture being preferably maintained in the region of 4 to 10 in order to facilitate the coupling reaction. The resulting disazo dyestuff can then be isolated by conventional methods.

The coupling components of Formula II can themselves be obtained by a number of methods such as are described for example in "Heterocyclic Compounds — Pyridine and its derivatives — Part 3" which was edited by Klingsberg and published by Interscience Publishers in 1962. Typical methods include, for example, (1) condensing together compounds of the formula $T^1COCH_2COO$ alkyl and $T^2CH_2COO$ alkyl in the presence of an excess of an amine of the formula $Z\text{-}NH_2$, (2) cyclisation of an $\alpha{:}\beta$-disubstituted glutaconamide of the formula

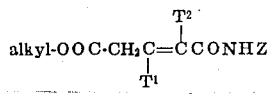

which is itself obtained by condensing together in the presence of a basic catalyst compounds of the formulae $T^1COCH_2COO$-alkyl and $T^2CH_2CONHZ$, or (3) cyclisation of an $\alpha{:}\beta$-disubstituted glutaconamide of the formula:

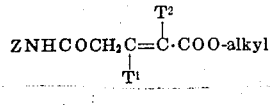

which is itself obtained by condensing together compounds of the formulae $T^1COCH_2CONHZ$ and $T^2CH_2COO$-alkyl.

As specific examples of coupling components of Formula II there may be mentioned 2:6-dihydroxypyridine, 2:6-dihydroxy-3-cyano-4-methylpyridine, 1-(methyl or ethyl)-3-cyano-4-methyl-6-hydroxypyrid-2-one, 1-(β-hydroxyethyl or γ-methoxypropyl)-3-cyano-4-(methyl, phenyl or ethyl)-6-hydroxypyrid-2-one, 1-(phenyl, p-tolyl or p-anisyl)-3-cyano-4-(methyl or phenyl)-6-hydroxypyrid-2-one, 1-phenyl-3-(carbonamido or carboethoxy)-4-(methyl or phenyl)-6-hydroxypyrid-2-one, 2:6-dihydroxy-3-(carbonamido, carboethoxy, carbodiethylamido)-4-methylpyridine, 2:6-dihydroxy-3-(carbonamido or carboethoxy)-pyridine, 2:6-dihydroxy-3-carbonamido-4-phenylpyridine, 2:6-dihydroxy-3-cyano-4-carbonamidopyridine, 2:6-dihydroxy-3-cyano-4-(carbomethoxy or carboethoxy)-pyridine, ethyl 2:6-dihydroxy-3-cyanopyrid-4-ylacetate, 2:6-dihydroxy-3-cyanopyrid-4-ylacetamide, 2:6-dihydroxy-3:4-di(carboethoxy)-pyridine, 2:6-dihydroxy-3-carbonamido-4-carboethoxypyridine, 2:6-dihydroxy-4-methylpyridine, ethyl 2:6-dihydroxy isonicotinate, 2:6-dihydroxy isonicotinamide, 2:6-dihydroxy isonicotinic acid diethylamide, 2:6-dihydroxy-4-cyanopyridine, 2:6-dihydroxy-4-phenylpyridine, 2:6-dihydroxy-4-(p-hydroxyphenyl-pyridine, 2:6-dihydroxy-4-(p-methoxyphenyl)pyridine, 2:4:6-trihydroxypyridine, and 2:6-dihydroxy-3-cyano-4-ethoxycarbonylmethylpyridine.

The amines of Formula I can themselves be obtained by diazotising an amine of the formula $A\text{—}NH_2$ and coupling the resulting diazo compound with an amine of the formula $H\text{—}B\text{—}NH_2$, or with an ω-methanesulphonate thereof, the ω-methanesulphonate group then being removed by hydrolysis. In general it is unnecessary to isolate the resulting amine of Formula I before proceeding to carry out the process of the invention.

The amines of the formula $A\text{—}NH_2$ are preferably diazotisable primary amines of the anthraquinone, naphthalene, thiazole, benzthiazole, thiadiazole, thiophene, and, above all, of the benzene series. As specific examples of diazotisable primary amines of the benzene series there may be mentioned aniline, o-, m- or p-toluidine, o-, m- or p-anisidine, o-, m- or p-chloroaniline, o-, m- p-bromoaniline, o-, m- or p-nitraniline, 2:5-dichloroaniline, 2:4-dinitroaniline, 2:4-dinitro-6-(chloro or bromo)aniline, 4-methanesulphonylaniline, 4-aminobenzotrifluoride, 4- or 5-nitro-2-toluidine, 4- or 5-nitro-2-anisidine, 4- or 5-chloro-2-anisidine, 4- or 5-chloro-2-toluidine, 4- or 5-bromo-2-anisidine, 2:6-di(chloro-or bromo-) 4-nitroaniline, 2:4:6-trinitroaniline, 2:4-dinitro-6-carbomethoxyaniline, 2-amino-5-nitrobenzotrifluoride, 2:4-bis(methanesulphonyl)aniline, 2-(chloro- or bromo-)-4-nitroaniline, methylanthranilate, 4- or 5-nitromethylanthranilate, 4-aminobenzamide, 2:6-di(chloro- or bromo-)aniline-4-sulphonamide, 2:6-di(chloro- or bromo-)-4-methylsulphonylaniline, 2:5-di-(chloro or bromo-)-4:6-dinitroaniline, 2-amino-3:5-dinitrobenzotrifluoride, 3-amino- 2-(chloro- or bromo-)-4:6-dinitro-(toluene or anisole), 3-amino-4-(chloro- or bromo-)-2:6-dinitro-(toluene or anisole), 3-amino-2:4:6-trinitrotoluene, 2-(chloro- or bromo-)-4-methyl-sulphonylaniline, 2-(chloro- or bromo-)-4-thiocyanatoaniline, 2-chloro- or bromo-)-4-sulphamylaniline, 2-amino-5-nitrophenylmethylsulphone, 2-amino-3:5-dinitrophenylmethylsulphone, 2-amino-3-(chloro- or bromo-)5-nitrophenylmethylsulphone, 2-sulphamyl-4-nitroaniline, 2-methylsulphamyl-4-nitroaniline, 2-ethylsulphamyl-4-nitroaniline, 2-butylsulphamyl-4-nitroaniline, 2-dimethylsulphamyl-4-nitroaniline, 2-methylsulphamyl-4:6-dinitroaniline, 2-methylsulphamyl-4-nitro-6-(chloro- or bromo-)aniline, 2-phenylsulphamyl-4-nitroaniline, methyl 2-amino-3-(chloro- or bromo-)5-nitrobenzoate, methyl 2-amino-3:5-dinitrobenzoate, dimethyl 2-aminoterephthalate and dimethyl 2-amino-5-nitroterephthalate. As specific examples of diazotisable amines of the anthraquinone series there may be mentioned 1- or 2-aminoanthraquinone, 1-amino-2-(chloro- or bromo-)anthraquinone, 1-amino-2-methylanthraquinone, 1-amino-3-chloroanthraquinone, 1-amino-4- or 5-benzoylaminoanthraquinone and 1-amino-3-trifluoromethylanthraquinone. As specific examples of diazotisable amines of the naphthalene series there may be mentioned 1-naphthylamine, 1-naphthylamine-4-sulphonamide, 4-methylsulphonyl-1-naphthylamine and 6-(N-methylsulphamyl)-2-naphthylamine. As specific examples of diazotisable primary amines of the thiazole series there may be mentioned 2-aminothiazole, 5-nitro-2-aminothiazole, 4-methyl-5-nitro-2-aminothiazole, 4-phenyl-5-nitro-2-aminothiazole and 2-amino-5methylsulphonylthiazole. As specific examples of diazotisable primary amines of the benzthiazole series there may be mentioned 2- aminobenzthiazole, 6-(methoxy or ethoxy)-2-aminobenzthiazole, 2-amino-6-methylsulphonylbenzthiazole, 2-amino-6-nitrobenzthiazole, 2-amino-6-thiocyanobenzthiazole, 2-amino-6-cyanobenzthiazole and 2-amino-6-(β-hydroxyethylsulphonyl)benzthiazole. As specific examples of diazotisable primary amines of the thiadiazole series there may be mentioned 2-amino-5-methyl-1:3:4-thiadiazole, 2-amino-5-phenyl-1:3:4-thiadiazole, 5-amino-3-phenyl-1:2:4-thiadiazole and 5-amino-3-methyl-1:2:4-thiadiazole. As specific examples of diazotisable primary amines of the thiophene series there may be mentioned 2-amino-3-nitro-5-acetylthiophene and 2-amino-3-nitro-5-benzoylthiophene.

As examples of amines of the formula H—B—NH$_2$ there may be mentioned m-toluidine, 2:5-dimethoxyaniline, 2-methoxy-5-methylaniline, m-aminoacetanilide, m-chloroaniline, 2:5-dichloroaniline, m-trifluoromethylaniline, 2-(chloro- or bromo)-5-methylaniline, 1-naphthylamine, 1-naphthylamine-5-, 6- or 7-sulphonamide, 1-(2'-, 3'- or 4'-aminophenyl)-3-methyl-5-pyrazolone, 1-(2'-, 3'- or 4'-aminophenyl)-3-(carbonamido, carbomethoxy or carboethoxy)-5-pyrazolone.

A preferred class of the disazo dyestuffs of the invention comprises the dyestuffs of the formula:

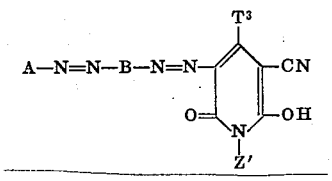

wherein A and B have the meanings stated, T$^3$ is lower alkyl, preferably methyl, and Z' is optionally substituted lower alkyl, preferably ethyl, β-hydroxyethyl γ-methoxypropyl, or optionally substituted phenyl.

A second preferred class comprises the dyestuffs of the formula:

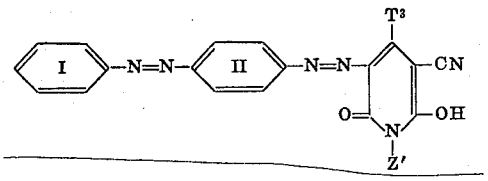

wherein Z' and T$^3$ have the meanings stated, and the benzene rings I and II can contain constituents other than carboxylic and sulphonic acid groups.

The water-insoluble disazo dyestuffs of the invention are valuable for colouring synthetic textile materials, in particular cellulose acetate and cellulose triacetate textile materials, polyamide textile materials such as polyhexamethyleneadipamide textile materials, and preferably aromatic polyester textile materials such as polyethylene terephthalate textile materials. Such textile materials can be in the form of thread, yarn or woven or knitted fabric.

Such texile materials can conveniently be coloured with the disazo dyestuffs, as hereinbefore defined, by immersing the textile material in a dyebath comprising an aqueous dispersion of one or more of the said dyestuffs, which dyebath preferably contains a non-ionic, cationic and/or anionic surface-active agent, and thereafter heating the dyebath for a period at a suitable temperature. In the case of a secondary cellulose acetate textile material it is preferred to carry out the dyeing process at a temperature between 60° and 86°C.; in the case of cellulose triacetate or polyamide textile material it is preferred to carry out the dyeing process at 95° to 100°C.; in the case of aromatic polyester textile materials the dyeing process can either be carried out at a temperature between 90° and 100° C., preferably in the presence of a carrier such as diphenyl or o-hydroxydiphenyl, or at a temperature above 100°C., preferably at a temperature between 120° and 130°C., under superatmospheric pressure.

Alternatively the aqueous dispersion of the said disazo dyestuff can be applied to the textile material by a padding or printing process, followed by heating or steaming of the textile material. In such processes it is preferred to incorporate a thickening agent, such as gum tragacanth, gum arabic or sodium alginate into the aqueous dispersion of the said monoazo dyestuff.

At the conclusion of the colouring process it is preferred to give the coloured textile material a rinse in water or a brief soaping treatment before finally drying the coloured textile material. In the case of aromatic polyester textile materials it is also preferred to subject the coloured textile material to a treatment in an alkaline aqueous solution of sodium hydrosulphite before the soaping treatment in order to remove loosely attached dyestuff from the surface of the textile material.

The disazo dyestuffs have excellent affinity and building up properties on synthetic textile materials, and in particular on aromatic polyester textile materials, so enabling deep shades to be obtained. The resulting colorations which range in shade from yellow to blue have excellent fastness to light, to wet treatments, and, in particular, to dry heat treatments such as those carried out at high temperatures during pleating operations.

If desired the dyestuffs of the invention can be applied to synthetic textile materials in conjunction with other disperse dyes, such as are described in, for example, British Pat. specification Nos. 806271, 835819, 840903, 847175, 852396, 852493, 859899, 865328, 872204, 894012, 909656, 909843, 910306, 913856, 919424, 944513, 944722, 953887, 959816, 960235, 961412, 976218, 988629, 993162, 998858, 1,012,238, 1,102,239, 1,016,651, 1,016,246, 1,020,303, 1,037,649, 1,047,089, 1,048,250, 1,048,882, 1,049,039, 1,053,830, 1,053,997 and 1,056,354.

The disazo dyestuffs of the invention, either singly or in the form of mixtures, in the form of dry powders are also valuable for use as pigments in the coloration of paints, giving a wide range of bright shades having excellent fastness to heat, to light and to solvents when incorporated in alkyd or other paint media. Alternatively the disazo dyestuffs of the invention can be used for mass colouring of synthetic polymers, such as polyvinyl chloride, polyethene, polystyrene, cellulose acetate, polyamides or polyesters; the dyestuffs being incorporated into the polymer by the methods conventionally employed for mass-colouring synthetic polymers.

Alternatively the dyestuffs in the form of dispersed pastes, which can be obtained by milling the dyestuffs in aqueous medium containing one or more dispersing agents, can be used for colouring emulsion paints, for the coloration of wallpaper, for textile printing, for the coloration of paper and paper laminates, for flushing into paint vehicles or lithographic varnish or for use in the mass coloration of fibre-forming materials such as viscose. In these applications the disazo dyestuffs are notable for their brightness, their tinctorial strength, and for their fastness to light and to solvents.

The disazo dyestuffs of the invention can if desired be also formed in situ on textile materials. Thus, for example, textile materials, such as cellulose textile materials, can be impregnated with an aqueous alkaline solution of a coupling component of Formula II and then treated with a solution or suspension of a diazotised amine of Formula I or a stable salt thereof, such as a complex with zinc chloride. Alternatively the diazotised amine can be used in the form of a stable diazoamino derivative which is applied to the textile material in admixture with the coupling component, the disazo dyestuff then being generated on the textile material by a subsequent acidic treatment or by neutral steaming.

The invention is illustrated but not limited by the following Examples in which the parts and percentages are by weight.

EXAMPLE 1

12 parts of a 14 percent aqueous solution of sodium nitrite are added with stirring to a mixture of 3.94 parts of 4-aminoazobenzene, 25 parts of acetic acid and 5 parts of a 10N aqueous solution of hydrochloric acid at 5°C., and the mixture is stirred for a further 15 minutes at 5°C. The mixture is then slowly added during 15 minutes to a solution of 3.6 parts of 1-ethyl-2-hydroxy-3-cyano-4-methylpyrid-6-one, 5 parts of sodium acetate and 0.8 part of sodium hydroxide in 110 parts of water at 10°C., and the mixture is stirred for a further 10 minutes. The precipitated dyestuff is then filtered off, washed with water and dried.

When dispersed in aqueous medium the dyestuff so obtained dyes aromatic polyester textile materials in deep orange shades of excellent fastness properties.

EXAMPLE 2

In place of the 3.94 parts of 4-aminoazobenzene used in Example 1 there are used 4.22 parts of 4-amino-4'-methylazobenzene whereby a dyestuff is obtained which dyes aromatic polyester textile materials in deep reddish-orange shades of excellent fastness properties.

EXAMPLE 3

In place of the 3.6 parts of 1-ethyl-2-hydroxy-3-cyano-4-methylpyrid-6-one used in Example 1 there are used 4.4 parts of 1-(γ-methoxypropyl)-2-hydroxy-3-cyano-4-methylpyrid6-one whereby a similar orange dyestuff is obtained.

The following Table gives further examples of dyestuffs within the scope of the invention which are obtained by diazotising the aminoazo compounds listed in the second column of the Table and coupling the resulting diazo compounds with the coupling components listed in the third column of the Table by methods similar to that described in Example 1. The fourth column of the Table indicates the shades obtained when the dyestuffs are applied to aromatic polyester textile materials.

| Example | Aminoaz Compound | Coupling Component | Shade |
|---|---|---|---|
| 4 | 4-amino-4'-methylazobenzene | 1-(γ-methoxypropyl)-3-cyano-4-methyl-6-hydroxypyrid-2-one | Reddish Orange |
| 5 | 2-methyl-4-amino-5-methoxy azobenzene | 1-ethyl-3-cyano-4-methyl-6-hydroxy pyrid-2-one | Red |
| 6 | 2:5-dimethoxy-4-aminoazo-benzene | do. | Rubine |
| 7 | do. | 1-(β-hydroxyethyl)-3-cyano-4-methyl-6-hydroxypyrid-2-one | do. |
| 8 | 2:5:4'-trimethoxy-4-amino-azobenzene | do. | Violet |
| 9 | 4-aminoazobenzene | 2:6-dihydroxypyridine | Orange |
| 10 | do. | 3-cyano-4-methyl-2:6-dihydroxy pyridine | do. |
| 11 | do. | 1-ethyl-3-cyano-4-phenyl-6-hydroxypyrid-2-one | do. |
| 12 | do. | 1-phenyl-3-cyano-4-methyl-6-hydroxypyrid-2-one | do. |
| 13 | do. | 1-(p-tolyl)-3-cyano-4-methyl-6-hydroxy-pyrid-2-one | do. |
| 14 | do. | 1-(p-methoxyphenyl)-3-cyano-4-methyl-6-hydroxypyrid-2-one | do. |
| 15 | do. | 1-phenyl-3-carbonamido-4-methyl-6-hydroxypyrid-2-one | do. |
| 16 | do. | 3-carbonamido-4-methyl-2:6-dihydroxypyridine | do. |
| 17 | do. | 3-carboethoxy-4-methyl-2:6-dihydroxypyridine | Orange |
| 18 | do. | 3-cyano-4-carbonamido-2:6-dihydroxypyridine | do. |
| 19 | do. | 3-cyano-4-carbo-N:N-diethylamido-2:6-dihydroxypyridine | do. |
| 20 | do. | 3-cyano-4-(piperidin-1'-yl carbonamido)-2:6-dihydroxypyridine | do. |
| 21 | do. | 3-cyano-4-(morpholin-1'-yl carbonamido)-2:6-dihydroxypyridine | do. |
| 22 | do. | 3-cyano-4-(carboethoxymethyl)-2:6-dihydroxypyridine | do. |
| 23 | do. | 3:4-dicarbonamido-2:6-dihydroxypyridine | do. |
| 24 | do. | 4-methyl-2:6-dihydroxypyridine | do. |
| 25 | do. | 2:6-dihydroxy-iso-nicotinamide | do. |
| 26 | do. | 2:6-dihydroxy-iso-nicotinic acid diethylamide | do. |
| 27 | do. | 4-phenyl-2:6-dihydroxypyridine | do. |
| 28 | do. | 2:4:6-trihydroxypyridine | do. |
| 29 | 4-amino-4'-methoxyazobenzene | 3-cyano-4-methyl-2:6-dihydroxy-pyridine | Scarlet |

Table—Continued

| Example | Aminoaz Compound | Coupling Component | Shade |
|---|---|---|---|
| 30 | 4-amino-4'-methoxyazobenzene | 1-phenyl-3-carbonamido-4-methyl-6-hydroxypyrid-2-one | Scarlet |
| 31 | do. | 1-(p-tolyl)-3-cyano-4-methyl-6-hydroxypyrid-2-one | do. |
| 32 | do. | 1-ethyl-3-cyano-4-methyl-6-hydroxypyrid-2-one | do. |
| 33 | 2-methyl-4-amino-4'-nitro-5-methoxyazobenzene | do. | Orange |
| 34 | do. | 1-($\beta$-hydroxyethyl)-3-cyano-4-methyl-6-hydroxypyrid-2-one | do. |
| 35 | do. | 1-($\gamma$-methoxypropyl)-3-cyano-4-methyl-6-hydroxypyrid-2-one | do. |
| 36 | do. | 1-phenyl-3-cyano-4-methyl-6-hydroxypyrid-2-one | do. |
| 37 | do. | 3-carbonamido-4-methyl-2:6-dihydroxypyridine | do. |
| 38 | do. | 3-carboethoxy-4-methyl-2:6-dihydroxypyridine | do. |
| 39 | 2:5-dimethoxy-4-amino-4'-chlorobenzene | 2:6-dihydroxypyridine | Red |
| 40 | do. | 2:4:6-trihydroxypyridine | Rubine |
| 41 | 2:5-dimethoxy-4-amino-4'-chloroazobenzene | 1-ethyl-3-acetyl-4-methyl-6-hydroxypyrid-2-one | Red |
| 42 | do. | 1-ethyl-3-cyano-4-methyl-6-hydroxypyrid-2-one | do. |
| 43 | do. | 3:4-dicyano-2:6-dihydroxypyridine | do. |
| 44 | 1-amino-4-phenylazonaphthalene | 1-phenyl-3-cyano-4-methyl-6-hydroxypyrid-2-one | do. |
| 45 | do. | 3-carboethoxy-4-methyl-2:6-dihydroxypyridine | do. |
| 46 | do. | 4-methyl-2:6-dihydroxypyridine | do. |
| 47 | do. | 1-ethyl-3-cyano-4-methyl-6-hydroxypyrid-2-one | do. |
| 48 | 1-(p-aminophenyl)-3-methyl-4-(p-nitrophenylazo)-5-pyrazoline | do. | Yellow |
| 49 | do. | 1-(p-methoxyphenyl)-3-carbonamido-4-methyl-6-hydroxypyid-2-one | Reddish Yellow |
| 50 | 2-methyl-4-amino-4'-nitrobenzene | 1-($\gamma$-methoxypropyl)-3-cyano-4-methyl-6-hydroxypyrid-2-one | Yellow |
| 51 | 2-methoxy-4-amino-4'-nitroazobenzene | 1-($\gamma$-methoxypropyl)-3-cyano-4-methyl-6-hydroxypyrid-2-one | Reddish Yellow |
| 52 | 2-chloro-4-amino-4'-methoxyazobenzene | do. | Orange |
| 53 | 2-methoxy-4-amino-4'-trifluoromethyl-5-methylazobenzene | do. | Red |
| 54 | 2-methoxy-4-amino-4'-ethylsulphonyl-5-methylazobenzene | do. | do. |
| 55 | 2-methoxy-4-amino-4'-carboethoxy-5-methylazobenzene | do. | do |
| 56 | 2-methoxy-4-amino-4'-diethylaminoazobenzene | do. | Blue |
| 57 | do. | 1-phenyl-3-carbonamido-4-methyl-6-hydroxypyrid-2-one | do. |
| 58 | 4-amino-4'-diethylamino-azobenzene | 1-ethyl-3-cyano-4-methyl-6-hydroxypyrid-2-one | do. |
| 59 | do. | 1-(p-tolyl)-3-carbonamido-4-methyl-6-hydroxypyrid-2-one | do. |
| 60 | do. | 4-phenyl-2:6-dihydroxypyridine | do. |
| 61 | 1-(2':5'-dimethoxy-4'-aminophenylazo)anthraquinone | 1-phenyl-3-cyano-4-methyl-6-hydroxypyrid-2-one | Red |
| 62 | do. | 1-(2':5'-dimethoxy-4'-chlorophenyl)-3-cyano-4-methyl-6-hydroxypyrid-2-one | do. |
| 63 | 4-amino-2':4'-dibromoazobenzene | 1-($\gamma$-methoxypropyl)-3-cyano-4-methyl-6-hydroxypyrid-2-one | Orange |
| 64 | 2-acetylamino-4-amino-2':4'-dibromoazobenzene | do. | Red |
| 65 | 4-amino-4'-carbonamido-azobenzene | do. | Orange |
| 66 | 4-amino-4'-sulphonamido-azobenzene | do. | do. |
| 67 | 4-amino-4'-sulphon-N-etylamido-azobenzene | do. | do. |
| 68 | 4-amino-3-chloro-4'-methylsulphonylazobenzene | do. | Red |
| 69 | 4-amino-4'-methylsulphonylazobenzene | do. | do. |
| 70 | 4-amino-2-trifluoromethyl-4'-methylsulphonylazobenzene | do. | do. |
| 71 | 2-(4'-amino-2'-methoxy-5'-methylphenylazo)-thiazole | do. | do. |
| 72 | 2-(4'-amino-2'-methoxy-5'-methylphenylazo)-benzthiazole | do. | do. |
| 73 | 2-(4'-amino-2'-methoxy-5-methylphenylazo)-6-nitrobenzthiazole | 1-($\gamma$-methoxypropyl)-3-cyano-4-methyl-6-hydroxypyrid-2-one. | Red |
| 74 | 4-amino-4'-sulphonamido-2-trifluoromethylazobenzene | do. | Orange |
| 75 | 4-amino-3'-sulphonamido-azobenzene | do. | Reddish Yellow |
| 76 | 4-amino-3'-sulphon-N:N-dimethylamido-azobenzene | do. | Orange |

The 1-(ethyl, β-hydroxyethoxy or γ-methoxypropyl)-3-cyano-4-methyl-6-hydroxypyrid-2-one used in the above Examples were obtained by condensing ethylacetoacetate, ethylcyanoacetate and ethylamine, β-hydroxyethylamine or γ-methoxypropylamine.

The 1-(phenyl, p-tolyl, p-methoxyphenyl or 2':5'-dimethoxy-4'-chlorophenyl)-3-cyano-4-methyl-6-hydroxypyrid-2-one were obtained by condensing acetoacetanilide or the appropriately substituted derivative thereof with ethyl cyanoacetate in the presence of sodium ethoxide.

The 1-phenyl-3-carbonamido-4-methyl-6-hydroxypyrid-2-one was obtained by hydrolysis of the 3-cyano compound in sulphuric acid.

Reaction of acetoacetamide with diethylmalonate in the presence of sodium ethoxide gave 3-carboethoxy-4-methyl-2:6-dihydroxypyridine which gave the corresponding amide when reacted with ammonia.

3-Cyano-4-carboethoxy-2:6-dihydroxypyridine on treatment with ammonia, diethylamine, piperidine or morpholine gave the corresponding amides.

1-Ethyl-3-acetyl-4-methyl-6-hydroxypyrid-2-one was obtained by reacting 1-ethyl-4-methyl-6-hydroxypyrid-2-one with acetyl chloride in the presence of aluminum chloride.

3:4-Dicyano-2:6-dihydroxypyridine was obtained by dehydration of 3-cyano-4-carbonamido-2:6-dihydroxypyridine.

3:4-Dicarbonamido-2:6-dihydroxypyridine was obtained by treating 3:4-dicarboethoxy-2:6-dihydroxypyridine with a concentrated aqueous solution of ammonia.

We claim:

1. A water-insoluble disazo dyestuff of the formula

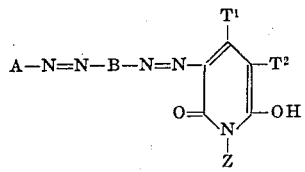

wherein A is selected from the group consisting of phenyl and phenyl substituted with a member selected from the group consisting of chlorine, bromine, lower alkyl, lower alkoxy, hydroxy, nitro, trifluoromethyl, thiocyano, lower alkylsulphonyl, lower alkylcarbonyl, carbo lower alkoxy, carbonamido, N-lower alkyl carbonamido, N:N-di (lower alkyl) carbonamido, sulphonamido, N-lower alkylsulphonamido, N:N-di (lower alkyl) sulphonamido and acetylamino;

B is selected from the group consisting of 1:4-phenylene and 1:4-phenylene substituted with a member selected from the group consisting of chlorine, bromine, lower alkyl, lower alkoxy, trifluoromethyl and acylamino of the formula —NHCOY wherein Y is selected from the group consisting of hydrogen, lower alkyl and phenyl;

Z is selected from the group consisting of hydrogen, lower alkyl, hydroxy lower alkyl, lower alkoxy lower alkyl, phenyl, chlorophenyl, methylphenyl and methoxyphenyl;

$T^1$ is selected from the group consisting of hydrogen, hydroxy, lower alkyl, phenyl, carbonamido and cyano; and $T^2$ is selected from the group consisting of hydrogen, cyano, carbonamido and acetyl.

2. A water-insoluble disazo dyestuff of the formula

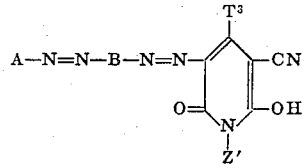

wherein A is selected from the group consisting of phenyl and phenyl substituted with a member selected from the group consisting of chlorine, bromine, lower alkyl, lower alkoxy, hydroxy, nitro, trifluoromethyl, thiocyano, lower alkylsulphonyl, lower alkylcarbonyl, carbo lower alkoxy, carbonamido, N-lower alkyl carbonamido, N:N-di (lower alkyl) carbonamido, sulphonamido, N-lower alkylsulphonamido, N:N-di (lower alkyl) sulphonamido and acetylamino;

B is selected from the group consisting of 1:4 phenylene and 1:4 phenylene substituted with a member selected from the group consisting of chlorine, bromine, lower alkyl, lower alkoxy, trifluoromethyl and acylamino of the formula -NHCOY wherein Y is selected from the group consisting of hydrogen, lower alkyl and phenyl; and Z' is selected from the group consisting of lower alkyl, hydroxy lower alkyl, lower alkoxy lower alkyl, phenyl, methylphenyl, methoxyphenyl and chlorophenyl.

3. A disazo dye of the formula

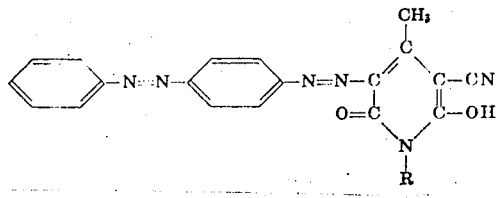

wherein:
R is alkyl of one to four carbon atoms, lower alkoxy lower alkyl or hydroxy lower alkyl.

* * * * *